(12) United States Patent
Audigier et al.

(10) Patent No.: US 9,440,497 B2
(45) Date of Patent: Sep. 13, 2016

(54) DEVICE FOR PROTECTING A GROOVE IN A TREAD

(75) Inventors: Richard Audigier, St-Laure (FR); Stéphane Oraison, Le Vernet (FR); Fabien Marlier, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 948 days.

(21) Appl. No.: 13/579,075

(22) PCT Filed: Feb. 22, 2011

(86) PCT No.: PCT/EP2011/052628
§ 371 (c)(1),
(2), (4) Date: Oct. 17, 2012

(87) PCT Pub. No.: WO2011/101495
PCT Pub. Date: Aug. 25, 2011

(65) Prior Publication Data
US 2013/0146191 A1    Jun. 13, 2013

(30) Foreign Application Priority Data
Feb. 22, 2010    (FR) ...................................... 10 51257

(51) Int. Cl.
*B60C 11/13*    (2006.01)
*B60C 11/04*    (2006.01)
(Continued)

(52) U.S. Cl.
CPC .............. *B60C 11/13* (2013.01); *B60C 11/032* (2013.04); *B60C 11/0323* (2013.04); *B60C 11/047* (2013.04); *B60C 11/12* (2013.01); *B60C 11/1281* (2013.04); *B60C 2011/1338* (2013.04)

(58) Field of Classification Search
CPC ........... B60C 11/0323; B60C 11/1307; B60C 11/042; B60C 11/045; B60C 11/047; B60C 11/1323; B60C 2011/1338
See application file for complete search history.

(56) References Cited

U.S. PATENT DOCUMENTS 2,322,505 A * 6/1943 Bull .......................... 152/209.21
3,095,024 A * 6/1963 Thomas .................... 152/209.21
(Continued)

FOREIGN PATENT DOCUMENTS

| FR | 2 548 097 | 1/1985 |
|---|---|---|
| GB | 903389 A | 8/1962 |

(Continued)

OTHER PUBLICATIONS

International Search Report (PCT/ISA/210) issued on Jun. 20, 2011, by the European Patent Office as the International Searching Authority for International Application No. PCT/EP2011/052628.

*Primary Examiner* — Justin Fischer
*Assistant Examiner* — Robert Dye
(74) *Attorney, Agent, or Firm* — Dickinson Wright PLLC

(57) ABSTRACT

A tire for a heavy goods vehicle, having a tread having a tread surface provided in the new state with at least one groove delimited by opposing side walls, this groove opening onto the tread surface in a discontinuous manner by way of a plurality of portions that are open towards the exterior of the tread, these open portions having two ends that are extended under the tread surface by channels having inlets connected to the ends of the open portions, these inlets to the channels having a mean surface area S. This tread is such that each open portion on the tread surface is provided at each of its ends with a closure device for partially closing the cross section of the inlets to the channels when the tire is running and for leaving a passage unclosed.

8 Claims, 4 Drawing Sheets

(51) Int. Cl.
*B60C 11/03* (2006.01)
*B60C 11/12* (2006.01)

(56) References Cited

U.S. PATENT DOCUMENTS 3,115,919 A    12/1963  Roberts
4,703,787 A *  11/1987  Ghilardi ................... 152/209.21
9,033,013 B2 *  5/2015  Brown .......................... 152/210

FOREIGN PATENT DOCUMENTS

JP      2002-219909    *  8/2002
WO      WO 99/48707       9/1999

* cited by examiner

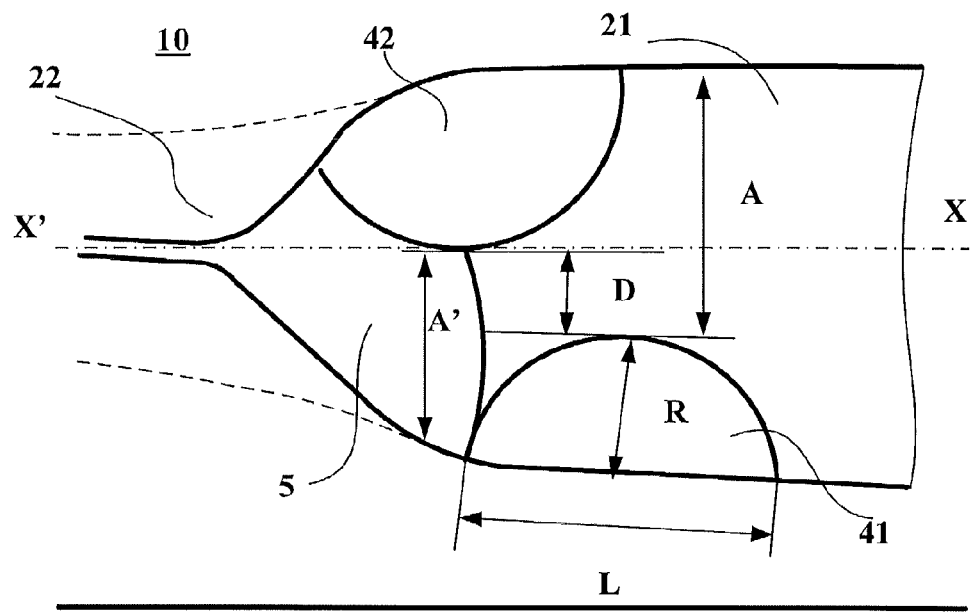
FIG. 5
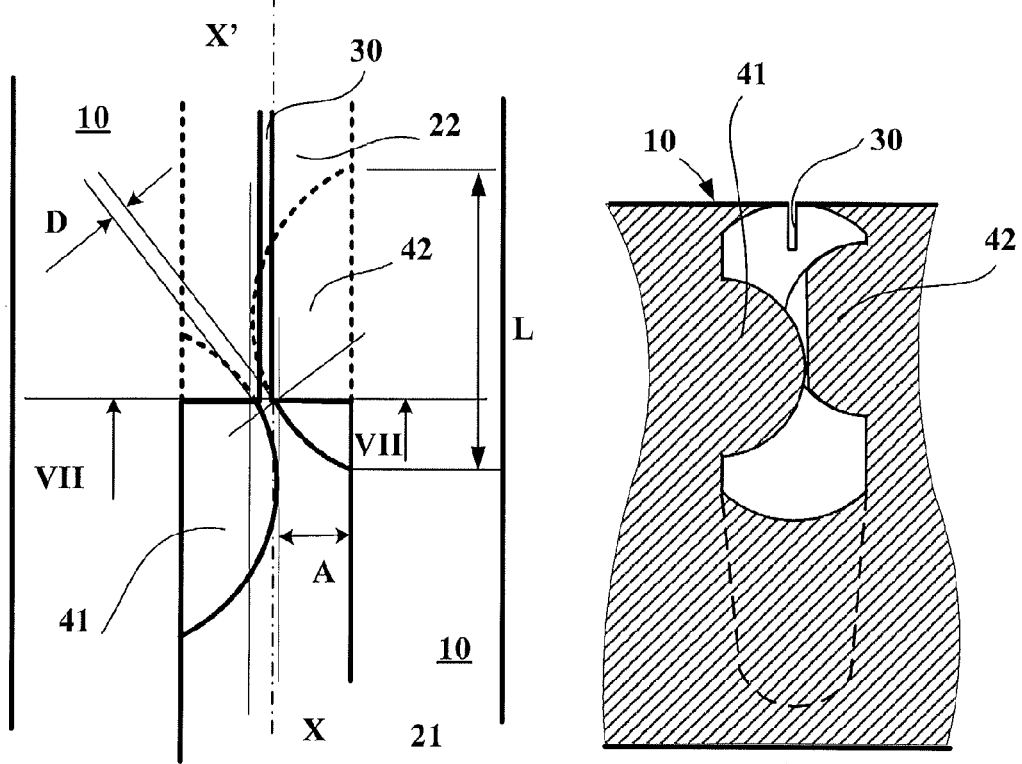
FIG 6
FIG 7

Coupe selon IX-IX

Coupe selon X-X

DEVICE FOR PROTECTING A GROOVE IN A TREAD

FIELD OF THE INVENTION

The invention relates to tyres for heavy goods vehicles and more particularly to the treads of these tyres.

PRIOR ART

A tyre for a heavy goods vehicle comprises a tread, the radial outer surface of which forms a tread surface intended to come into contact with the road surface during running. As is known, this tread is provided with grooves which, in contact with the road surface, form volumes that are able to drain away the water present on the road surface in wet weather.

Tyres for heavy goods vehicles have the particular feature of having a relatively great tread thickness compared with that of passenger car tyres, thereby allowing very high tyre use distances (several hundred thousand kilometers) to be obtained.

The presence of this thickness and the need to have a sufficient drainage capacity even after the tread has become partially worn mean that the person skilled in the art is forced to produce grooves, the depth of which in the new tread (i.e. before any running) is relatively great and thus close to the thickness of the tread. This great depth leads to a substantial reduction in rigidity at least in the new state of the tread and consequently results in a reduction in certain performance aspects.

For this reason, the applicants have proposed a new type of groove which formed the subject matter of a patent application which was not yet published on the production date of the present invention. This type of groove is shown with the aid of FIG. 1 of the present document.

According to this proposal, a tread 1 for a heavy goods vehicle tyre is provided with at least one groove 2 delimited by facing side walls, this groove 2 opening onto the tread surface 10 in a discontinuous manner at a plurality of portions that are open towards the exterior of the tread, the side walls being connected by a part that forms the bottom of the groove. These open portions 21 comprise two ends that are extended under the tread surface by first channels 22, 23, the channels 22 having inlets connected to the ends of the open portions 21. Each of these grooves 2 provides a drainage capacity in the new state by way of the continuity with the channels 22, 23; this drainage capacity is fulfilled in the worn state because, in combination with these first channels 22, 23, second continuous channels (not shown here) are integrally formed under the tread surface, these second channels being connected or not connected to the first channels 22, 23. Thus, it is possible to limit the reduction in stiffness of the tread, in particular the shear rigidity under tangential forces that are exerted during running in contact with a road surface, while preserving an appropriate capacity of the grooves to remove the water present on the road surface.

In the case of grooves that are completely open over the tread surface, it was known that objects (such as stones) could enter these grooves and attack the bottom of said grooves and that solutions were proposed that consisted in forming, on the bottom of said grooves, a continuous step or a plurality of discontinuous steps for preventing said objects from penetrating into the bottom of the grooves and damaging the reinforcement structure or carcass reinforcement of the tyre. A continuous step is understood to be a part in relief which is formed on the bottom of the groove and the height of which is at most 20% of the depth of said groove.

In the case of grooves that are partially open over the tread surface and have parts that form channels under the tread surface—these parts being intended themselves to become open over a tread surface obtained following partial wear— there is the problem, at least when the tread is new, of ensuring good circulation of the water in all of the groove, and in particular in the parts of these grooves underlying the tread surface, that is to say those that form channels inside the tread.

SUMMARY OF THE INVENTION

The object of the invention is to avoid the circulation of liquid in the grooves being prevented by foreign matter or foreign bodies being introduced into the parts that form channels radially under the tread surface.

The subject of the invention is a tyre for a heavy goods vehicle, having a tread having a tread surface intended to come into contact with a road surface, this tread being provided in the new state with at least one groove delimited by opposing side walls, these side walls being connected together by a groove bottom, this groove comprising, in the new state, a plurality of portions that are open towards the exterior of the tread and portions that form channels underlying the tread surface, each open portion having two ends and being extended on either side of the ends thereof under the tread surface by channels having inlets that are connected respectively to the ends of the open portions, these inlets to each channel having a mean surface area S, this tread being characterized in that at least one inlet to each channel is provided with a partial closure device for partially closing the cross section of the inlets to the channels while the tyre is running and for leaving a passage unclosed, this closure device comprising at least one protuberance formed on at least one wall delimiting the groove, this closure device being provided to close at least 40% of the cross-sectional surface area S of the inlets to the channels and at most 70% of this surface area S.

By virtue of this device for partially closing the ends of each groove part that forms a channel under the tread surface, it is possible to maintain an appropriate level of drainage of liquid while preventing the penetration of foreign bodies having dimensions such that these bodies cannot be ejected from the channels.

It should be understood that the formulation of the invention applies equally to the case where the channels of one and the same groove do not all have the same cross-sectional surface area S, that is to say that the channel inlets can vary from one channel to another.

Preferably, in order to leave a passage for water, the closure device is formed so as to create a passage that forms an opening between the closure device and the bottom of the groove, this passage having a cross section at least equal to 30% of the cross-sectional surface area S of the inlets to the channels.

Preferably, each closure device of at least one groove comprises two protuberances which are separated from one another in the direction of the width of the groove by a minimum distance D, each protuberance being supported by a wall of the groove and separated from the opposite wall of this same groove by a minimum distance A. This closure device is further such that the minimum distance D between two protuberances is less than the minimum distance A. Preferably, the minimum distance D between the protuberances is not zero in the new state.

In one embodiment of a closure device, the latter consists of two half-protuberances having a semi-hemispherical shape, each protruding from a wall delimiting a groove.

In each case, the device according to the invention makes use of a mechanism observed at the time that contact is made with the road surface: the change in curvature of the external surface of the tread and also variations in tension inside the reinforcing structures of the tyre lead to a transverse contraction (that is to say in a direction parallel to the rotational axis of the tyre) of the tread in the central part of the contact patch. The central part of the contact patch is understood here to be essentially the part which is plumb with the rotational axis. As a result, this produces a reduction in the width of the grooves oriented circumferentially from the inlet to the patch to the middle of this patch; this is followed again by an opening that runs towards the outlet. By virtue of this mechanism, which is inherent to the deforming of the tyre and to running, the device according to the invention is particularly effective, since, in the part that is most likely to collect foreign bodies, this device closes still further the inlet and outlet cross sections of the channels.

If, in spite of the presence of these closure devices, foreign bodies enter a part that forms a channel under the tread surface, these foreign bodies should not have dimensions such that they entirely block the cross section of said channel. As a result, a drainage capacity is maintained in each of the channels.

In a variant of the invention, the closure device of at least one inlet to each channel of one and the same groove, having discontinuous openings over a tread surface in the new state, is formed with at least one protuberance, each protuberance being entirely moulded on one wall of the channel, this protuberance being formed so as to be connected to the bottom of said channel, an opening being formed so as to be located to the side of each protuberance and above each protuberance.

Advantageously, the lateral part of the opening formed by the closure device of each channel has a width L1 which is equal to or even substantially equal to the width L2 of that part of the same opening that is located above each protuberance on the closure device.

According to another preferred variant, the width L1 is close to or equal to zero: in this case, this disconnects the protuberance, by a sort of incision, from the part of the tread located above (that is to say from that part of the tread that is located between the tread surface in the new state and the channel).

In another advantageous variant that is applied to a tyre having a preferred running direction that is indicated on the tyre by a visible indicator, each closure device is formed on a single inlet to each channel, this inlet corresponding to that part of each channel that makes first contact when the tyre is running on a road surface. Thus, very wide foreign bodies are prevented from entering a channel in a preferred entering direction in order to block said channel and reduce the possibility of drainage. The expression "very wide" should be understood as meaning a body having cross-sectional dimensions close to or greater than the cross-sectional dimensions of the inlets to the channels. Furthermore, the fact that only one closure device is put in each channel allows any foreign bodies that have passed through the opening located to the side, where the partial closure device is located, to be evacuated through the other inlet.

BRIEF DESCRIPTION OF THE DRAWINGS

Further features and advantages of the invention will become apparent from the following description, given with reference to the appended drawings which show, by way of non-limiting examples, embodiments of the subject of the invention.

FIG. 4-B shows in section the variant from FIG. 4-A as contact is made with a road surface;

FIG. 5 shows an elevation view of another variant of the device according to the invention, comprising two protuberances that are offset with respect to one another in the main direction of the groove;

FIG. 6 shows an elevation view of another variant of the device according to the invention, comprising two protuberances that are offset with respect to one another both in the main direction of the groove and in the direction of the depth of the groove;

FIG. 7 shows a section on the line in FIG. 6;

DETAILED DESCRIPTION OF THE DRAWINGS

In order to make it easier to read the figures, the same references have been used to indicate structurally or functionally identical elements.

Figure 1:
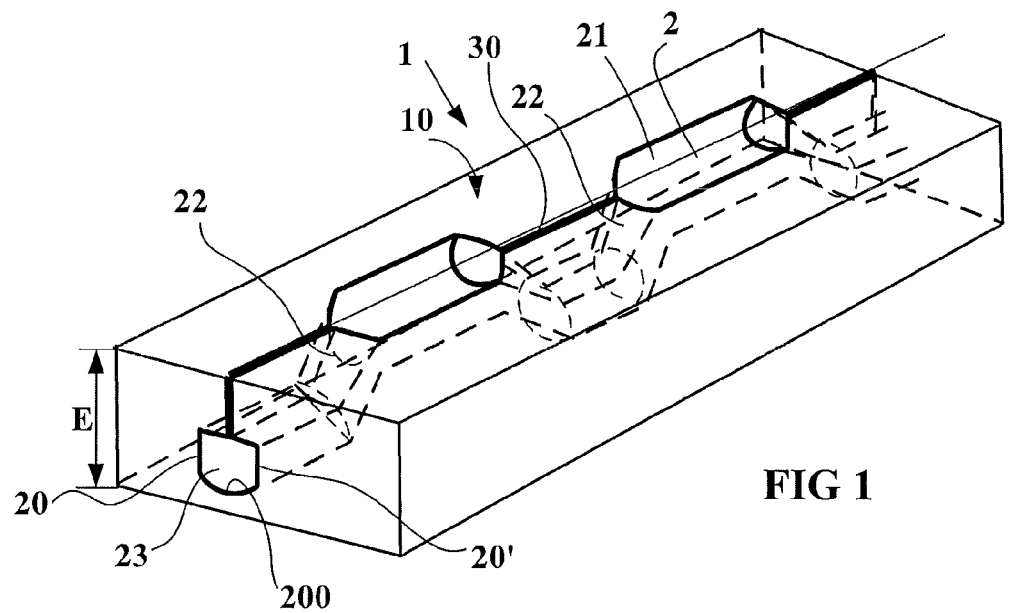
FIG. 1 shows a partial view of a tread having a groove comprising parts that open onto the tread surface and underlying parts.

FIG. 1 shows a partial view of a tread 1 comprising a tread surface 10 intended to come into contact with a road surface during the running of a tyre provided with this tread. This tread comprises at least one groove 2 intended in particular to drain the water present on the road surface in wet weather. This groove 2 is formed such that it has a plurality of open parts 21 on the tread surface 10 when the tread is new, that is to say when it has not yet become worn by running (corresponding to its state on exiting the mould). These open parts 21 on the tread surface are connected together by channels 22, 23 moulded under said surface to ensure the continuity of the groove 2. Each groove 2 is delimited by two facing walls 20, 20', these two walls 20, 20' being connected together by a groove bottom 200.

In order to make removal from the mould easier, each part of the groove that forms a channel 22, 23 under the tread surface is extended towards the tread surface 10 by an incision 30. An incision is understood here to mean a space delimited by facing walls that are separated by a distance of less than 2 mm and are liable to come into contact with one another under the usual use conditions.

In the new state of the tread and until the open parts 21 initially on the tread surface disappear, this type of groove 2 having parts that open onto the tread surface and are joined together by parts that form channels 22, 23 extending under the tread surface makes it possible to drain water, since the various parts of this groove are connected together. One advantage of this type of groove is that of limiting the maximum depth of the groove in the new state, since this maximum depth corresponds to the depth of the parts that open onto the tread surface and this depth is less than the depth of the innermost points of the groove 2 in the tread. These points correspond to the points at the bottom of the channels.

Figure 2:
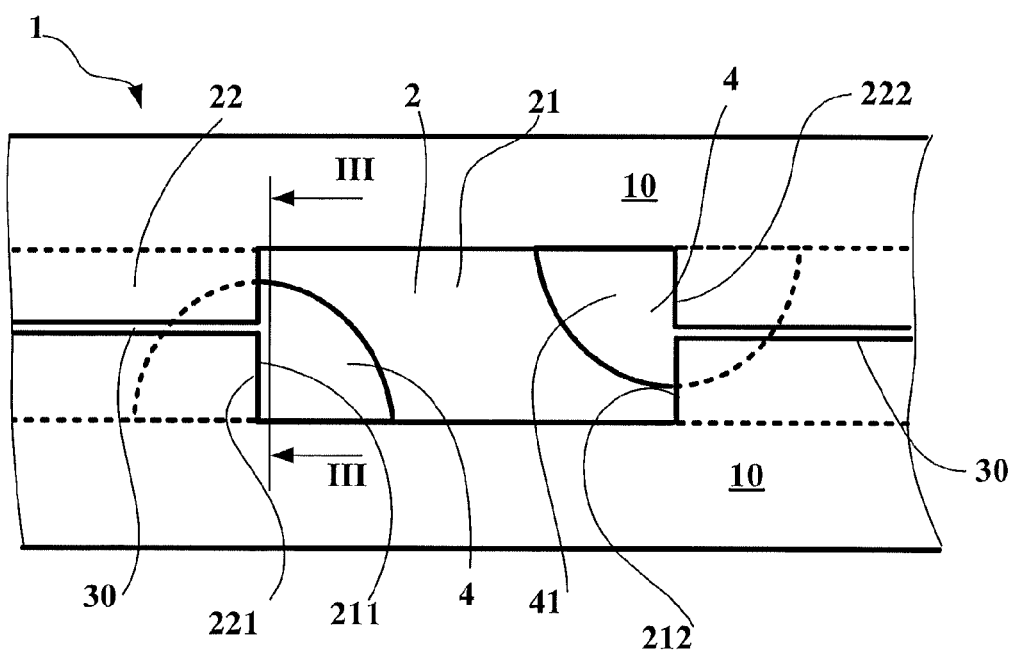
FIG. 2 shows a partial elevation view of a groove as shown in FIG. 1 and comprising a device according to a first variant of the invention.

FIG. 2 shows a part of the tread 1 having a groove 2 as shown in FIG. 1, this groove having a plurality of closure devices according to the invention. In this FIG. 2, an open part that forms a cavity 21 opening onto the tread surface 10 can be seen, this cavity 21 comprising two ends 211, 212 that are spaced apart from one another in the main direction of the groove. At each of these ends 211, 212, the cavity 21 is extended by a channel 22 that dips down into the thickness of the tread. Each channel comprises an inlet 221, 222 connected to one end 211, 212 of the cavity 21 that opens onto the tread surface, this inlet having a cross section having an area S. In line with the connection between each channel 22 and each cavity 21 on the tread surface there is formed a closure device 4 for partially closing the cross section of the inlets 221, 222 to the channels 22 during the running of the tyre and for leaving a passage 5 unclosed, regardless of the running conditions (this passage is visible in FIG. 3, which shows a cross section on a line III-III in FIG. 2). In the present case, the closure device 4 comprises a protuberance 41 having a semi-hemispherical shape, this protuberance 41 being formed by moulding on a wall 20, 20' delimiting the groove 2. In the case shown, approximately half of the protuberance 4 is formed in the cavity 21 that opens onto the tread surface and the other half is formed in the channel 22 that extends said cavity. Furthermore, the protuberances 4 are formed so as to alternate on one wall of the groove at one end and on the opposite wall at the other end. Opening onto the tread surface 10 there can be seen the incisions 30 that are formed between the channels 22, 23 and said tread surface.

Figure 3:
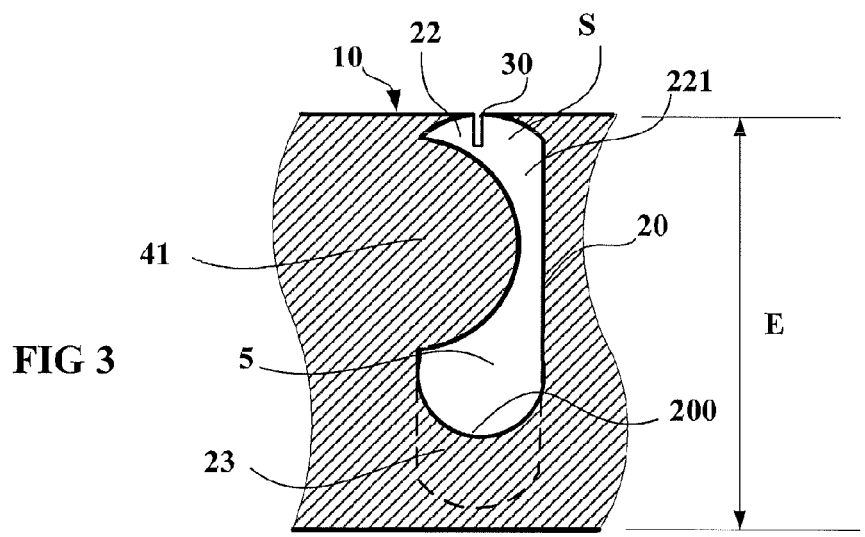
FIG. 3 shows a section along the line III-III in FIG. 2.

As can be seen in FIG. 3, which shows a section through the thickness of the tread on a line III-III in FIG. 2, a passage 5 is left between the bottom 200 of the groove and the protuberance. Regardless of the level of wear of the tread, this open passage 5 is at least equal to 30% of the cross-sectional surface area S of the inlets to the channels. In the present case, the cross-sectional surface area S of the inlet 221 to the channel 22 is equal to the cross section of the ends of the cavities 21 that open onto the tread surface. Dotted lines indicate the cross section of the channel 23 which, following partial wear, opens onto the new tread surface.

As a result, and even if this protuberance comes into contact with the opposite wall, drainage of the water remains possible by virtue of the passage 5.

The closure device shown in FIGS. 2 and 3 occupies in cross section a surface area equal to at least 40% of the cross-sectional surface area S of the inlets to the channels and at most 70% of this surface area S.

Figures 4A, 4B:
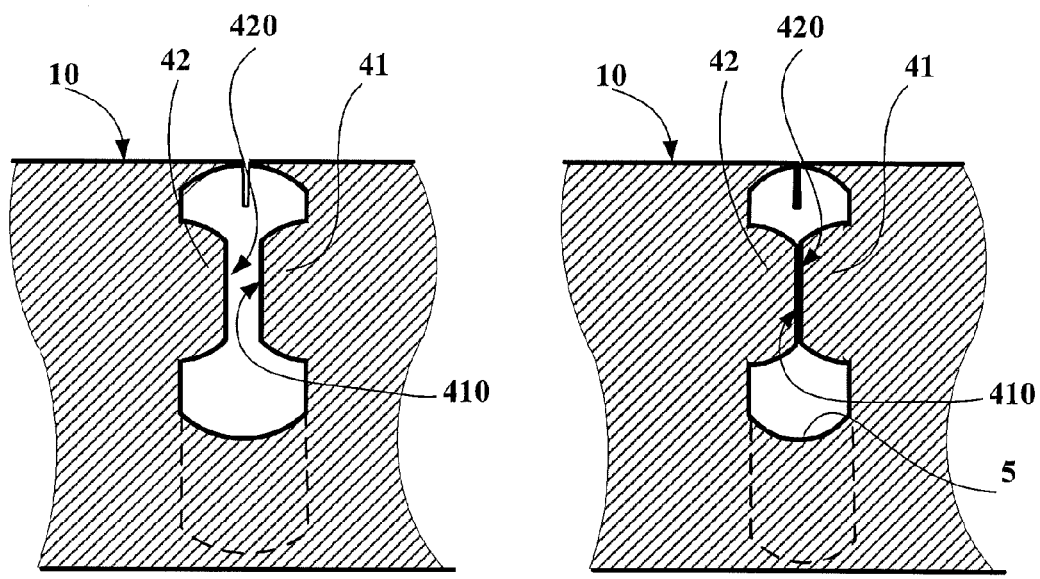
FIG. 4-A shows in section another variant of the device according to the invention, comprising two opposing protuberances.

FIG. 4-A shows in section another variant of the device according to the invention, having two protuberances 41, 42 located at each end of the groove parts that open onto the tread surface in the new state. In the variant shown, the protuberances 41, 42 have truncated semi-hemispherical shapes. Truncated should be understood to mean that they each have a planar part 410, 420 and that these planar parts face one another in the groove. During running, the planar parts 410, 420 move towards one another and come into contact with one another so as to partially close the inlet cross section of the channels extending the parts of the groove that open onto the tread surface.

FIG. 4-B shows the same variant while contact is made. The facing walls 410, 420 of the protuberances are in contact. Of course, a passage 5 is left between the protuberances 41, 42 and the bottom 200 of the groove in order to allow drainage of the water.

FIG. 5 shows an elevation view of another variant of the device according to the invention, comprising two protuberances 41, 42 that are offset with respect to one another in the main direction XX' of the groove, this corresponding to the circumferential direction in the present case.

The tyre provided with this tread is intended to equip a heavy goods vehicle and has the size 315/70 R 22.5. This tread comprises a groove having a plurality of open parts 21 on the tread surface, said open parts forming cavities 21, these cavities being extended at the ends thereof by a channel 22 formed under said surface.

The cavities that open onto the tread surface in the new state have a mean length of 150 mm.

The parts that form a channel 22 between two cavities 21 opening onto the tread surface have a total length of 140 mm. These parts that form a channel comprise portions inclined at an angle of 23 degrees and parts that are substantially parallel to the tread surface (as is shown in FIG. 1).

The cavities 21 have a mean width of 12 mm and the walls are at an angle of 15 degrees to a perpendicular to the tread surface. The depth of these cavities is 7 mm.

The channels 22 extending these cavities that open onto the tread surface have a mean width of 9 mm and a height of 7 mm.

The closure device comprises a first protuberance 41 and a second protuberance 42, each of these protuberances having a thickness measured in the direction of the depth of the groove of 5.2 mm, a length L in the main direction XX' of the groove of 8.5 mm and a width R in the direction of the width of the groove of 5 mm. In that part 21 of the groove that opens onto the tread surface 10, the distance A between the first protuberance 41 present in this groove part and the facing wall of the groove is 7 mm. For the second protuberance, the distance A' separating this second protuberance 42 from the facing wall of the channel is 4 mm.

The minimum distance D between the two protuberances is 2 mm.

FIG. 6 shows another variant of the device, consisting of two protuberances 41, 42 that are offset with respect to one another in the main direction XX' of the groove. In this variant, the protuberances 41, 42 have a geometry identical to that of the protuberances of the variant shown by way of FIGS. 4-A and 4-B. This variant has the advantage of protecting a larger region of the transition region. This is because, by virtue of the offset between the protuberances, the protected length of the groove is greater and, as a result, the transition region formed between the groove parts 21 that open onto the tread surface and the parts 22 that form channels that dip into the thickness of the tread is better protected with respect to the introduction of non-fluid foreign bodies.

FIG. 7 shows a section taken on the line VII-VII in FIG. 6. In the present case, the two half-protuberances 41, 42 are formed at different depths while being offset in the direction of the groove. Advantageously, the minimum distance D between the two half-protuberances is smaller than the minimum distance A between each half-protuberance and the opposite wall of the groove. In this way, the flow of a fluid is promoted while the circulation of solid foreign bodies in the groove is limited.

Preferably, each closure device should be located as close as possible to the inlet to a channel in order to be effective. Thus, each protuberance of a closure device should be located in the part of the groove over at least 50% and at most 80% of its length in the groove part that opens onto the tread surface. This results in each protuberance extending over at least 20% of its length in a groove part that forms a channel and extends a groove part that opens onto the tread surface.

According to another preferred variant, the closure device of each channel is formed by a single protuberance moulded onto a wall of the channel and connected to the bottom of said channel so as to form an unclosed space both to the side of said protuberance and above said protuberance. In this variant, the closure device is located entirely in a channel.

Figure 8:
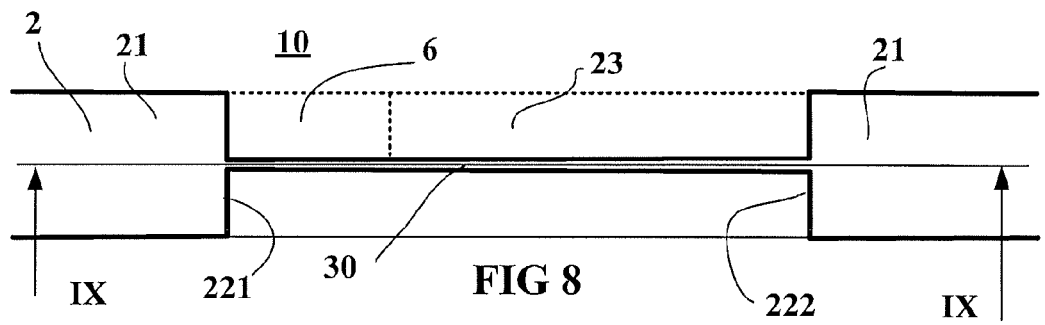
FIG. 8 shows a view of a part of a tread surface of a variant of the tread according to the invention.
Figure 9:
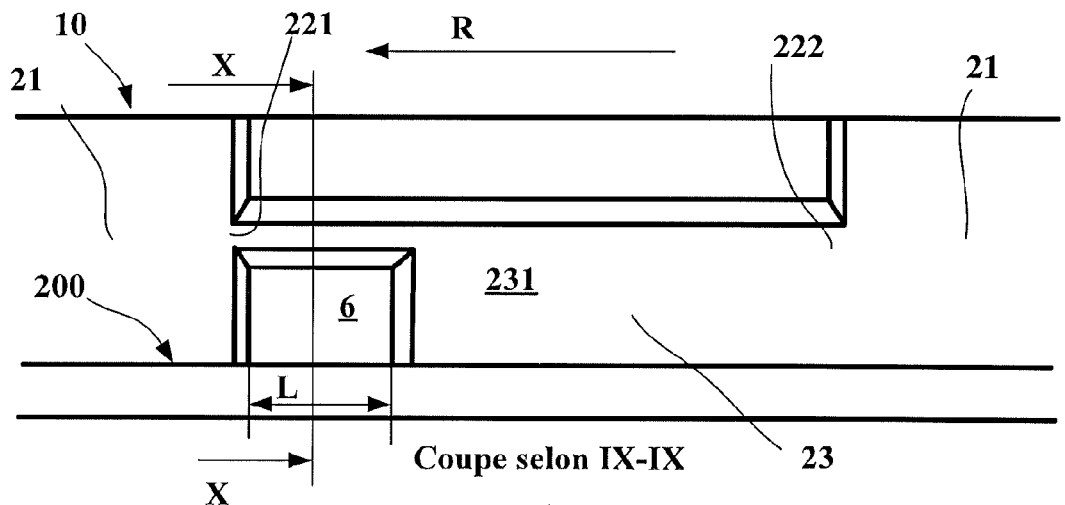
FIG. 9 shows a section view on a section plane, the line of which is indicated by the line IX-IX in FIG. 8.
Figure 10:
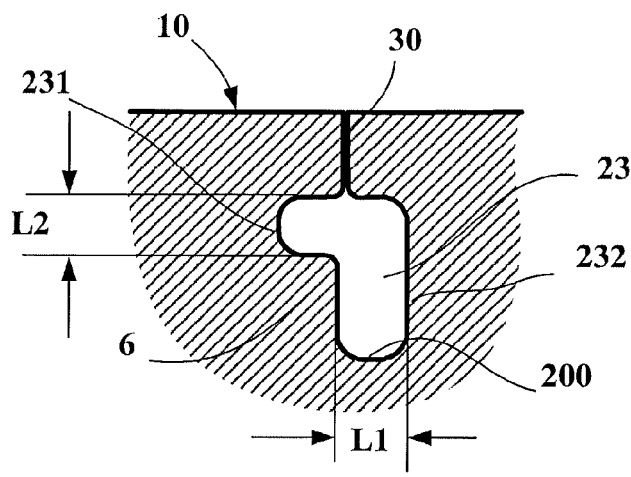
FIG. 10 shows a section view on a section plane, the line of which is indicated by the line X-X in FIG. 9.

This variant is illustrated by way of FIGS. 8 to 10, which show a part of a heavy goods vehicle tyre tread, this tread comprising at least one groove that opens, in the new state, in a discontinuous manner onto the tread surface of the tread, that is to say forming in an alternating manner open cavities on said surface and channel parts underlying said surface. In addition, the variant described corresponds to a tyre having a preferred running direction, this direction being indicated on the tyre by an indicator that is visible to the user; this indicator may, in a known manner, be an arrow.

FIG. 8 shows a part of a tread surface 10 of a tread and a groove 2 that opens onto said tread surface. Of this groove 2, two open cavities 21 on the tread surface 10 can be seen, these two cavities being connected together by a channel 23 underlying said surface. This channel is extended as far as the tread surface by an incision 30, the width of which is appropriate both for moulding and demoulding such a channel and to be closed when contact is made with a road surface during running. Following partial wear of this tread, each channel 23 opens onto the tread surface and thus forms new ridges. In this FIG. 8, it can be seen that an inlet 221 to the channel 23 is provided with a protuberance 6 forming a closure device, the other inlet 222 not having a closure device.

As can be seen in FIG. 9, which shows a section on a section plane, the line of which is indicated by the line IX-IX in FIG. 8, the preferred running direction of the tyre is indicated by the arrow R. This FIG. 9 shows the two cavities 21 that are connected together by the channel 23 located under the tread surface at a distance corresponding approximately to half the depth of the cavities 21. This channel 23 has side walls 231, 232 connected by a bottom 200 and is provided on one of its side walls 231 with a protuberance 6 moulded onto this side wall and onto the bottom 200 of the channel.

This protuberance 6 is located entirely inside the channel 23 and has a length L, measured in the main direction of the channel (parallel to the direction R), which is sufficient not to yield under the effect of the pressure of liquid flowing through the groove in wet weather and which is limited in order to preserve an appropriate channel volume. In practice, this protuberance 6 has a length L at least equal to three millimeters for tyres intended for heavy goods vehicles. Furthermore, there is provided an opening space that extends both to the side of this protuberance (that is to say between the protuberance and the opposite wall) with a width L1 and above this protuberance 6 (that is to say between the protuberance and that part of the tread that is located next to the tread surface 10 in the new state). This latter space having a width L2 is particularly useful for making it easier to demould this variant of a groove in a tread. This width L2 may be small or even zero: what is necessary is that there is no mechanical connection between the protuberance 6 and that part of the tread that is between the tread surface and said protuberance.

In the variant described here, the width L1 is equal to the width L2, this having the advantage of limiting, for a given opening surface area, the maximum size of foreign bodies that can circulate in the groove and more particularly in each channel.

In FIG. 10, which shows the same tread part on a section plane, the line of which in FIG. 9 is indicated by the line X-X, it can be seen that the space provided above the protuberance (that is to say between that part of the tread that is located between the tread surface in the new state and the protuberance) with a width L12 is substantially the same as the space provided laterally between the same protuberance 6 and the opposite side wall 232 (this wall corresponding to the wall of the channel that does not bear the protuberance).

In a variant which is not shown here, the protuberance may be connected to the bottom of the channel and also to that part of the tread which extends above it, that is to say to the part located towards the tread surface in the new state. However, this case is less favourable from a demoulding point of view, compared with the variant which was described by way of FIGS. 8 to 10.

The variant described here and having a single protuberance at an inlet to each channel may be modified such that each partial closure device is formed by two opposing protuberances delimiting an opening between one another.

It is also possible to provide each inlet to each channel with such a partial closure device, in particular when the tyre does not have a predefined preferred running direction.

The invention is not limited to the examples described and shown and various modifications can be made thereto without departing from its scope.

The invention claimed is:

1. A tire for a heavy goods vehicle, comprising a tread comprising:
    a tread surface adapted to come into contact with a road surface,
    in the new state at least one groove delimited by opposing side walls, these opposing side walls being connected together by a groove bottom,
wherein the groove comprises, in the new state:
    a plurality of open portions that are open towards the exterior of the tread and portions that form channels underlying the tread surface,
        wherein each open portion comprises two ends and extends on either side of the ends thereof under the tread surface by the channels underlying the tread surface by inlets that are connected respectively to the ends of the open portions,
        wherein these inlets to each channel underlying the tread having a mean cross-sectional surface area S,
        wherein at least one inlet to each channel underlying the tread is provided with a partial closure device for partially closing the cross section of the inlets to the channels underlying the tread while the tire is running and for leaving a passage unclosed,
        wherein a portion of the partial closure device is located within the inlet of the channel underlying the tread, and at least partially located in an adjacent open portion of the groove, and comprises at least one protuberance formed on at least one wall delimiting the groove, wherein the partial closure device closes at least 40% of the cross-sectional surface area S of the inlets to the channels and at most 70% of this cross-sectional surface area S.

2. The tire according to claim 1, wherein the partial closure device creates a passage between the partial closure device and the bottom of the groove, this passage having a cross-sectional surface area that is at least equal to 30% of the cross-sectional surface area S of the inlets to the channels underlying the tread.

3. The tire according to claim 1, wherein the partial closure device of at least one groove comprises two protuberances which are separated from one another in the direction of the width of the groove by a minimum distance D, each protuberance being supported by a wall of the groove and separated from the opposite wall of this groove by a minimum distance A, and wherein the minimum distance D between two protuberances is less than the minimum distance A.

4. The tire according to claim 3, wherein the partial closure device comprises two protuberances having a semi-hemispherical shape.

5. The tire according to claim 1, wherein the tire has a preferred running direction that is indicated by a visible indicator present on the tire, each partial closure device being formed on a single inlet to each channel underlying the tread, this inlet corresponding to that part of each channel that makes first contact when the tire is running on a road surface.

6. The tire according to claim 1, wherein the partial closure device of at least one inlet to each channel is formed with at least one protuberance, each protuberance being entirely molded on one wall of the channel, this protuberance being formed so as to be connected to the bottom of said channel, an opening being formed so as to be located to the side of each protuberance or above each protuberance or both.

7. The tire according to claim 6, wherein the opening formed so as to be located to the side of the protuberance has a width L1, this width L1 being equal to or substantially equal to a width L2 of the same opening that is located above each protuberance.

8. The tire according to claim 6, wherein the tire has a preferred running direction (R) that is indicated by a visible indicator present on the tire, each partial closure device being formed on a single inlet to each channel underlying the tread, this inlet corresponding to that part of each channel that makes first contact when the tire is running on a road surface.

* * * * *